United States Patent [19]
Amano

[11] Patent Number: 5,832,404
[45] Date of Patent: Nov. 3, 1998

[54] DEVICE FOR DETECTING MISFIRING IN A MULTI-CYLINDER INTERNAL COMBUSTION ENGINE

[75] Inventor: Hidetoshi Amano, Okazaki, Japan

[73] Assignee: Toyota Jidosha Kabushiki Kaisha, Aichi-Ken, Japan

[21] Appl. No.: 906,396

[22] Filed: Aug. 5, 1997

[30] Foreign Application Priority Data

Aug. 8, 1996 [JP] Japan .................................. 8-210047

[51] Int. Cl.⁶ .................................................. G01M 15/00
[52] U.S. Cl. .......................... 701/110; 73/116; 73/117.3; 123/419; 123/436
[58] Field of Search .................................. 73/116, 117.2, 73/117.3; 701/110, 111; 123/419, 425, 436

[56] References Cited

U.S. PATENT DOCUMENTS

| | | | |
|---|---|---|---|
| 5,044,195 | 9/1991 | James et al. | 73/117.3 |
| 5,245,865 | 9/1993 | Kayanuma | 73/117.3 |
| 5,245,866 | 9/1993 | Hashiguchi et al. | 73/117.3 |
| 5,263,365 | 11/1993 | Muller et al. | 73/117.3 |
| 5,275,037 | 1/1994 | Nakayama et al. | 123/419 |
| 5,307,671 | 5/1994 | Akase | 701/110 |
| 5,471,869 | 12/1995 | Kuroda et al. | 73/116 |
| 5,493,901 | 2/1996 | Kuroda et al. | 701/110 |
| 5,499,536 | 3/1996 | Wier et al. | 73/117.3 |
| 5,499,537 | 3/1996 | Nakayama et al. | 73/117.3 |
| 5,505,079 | 4/1996 | Rossignol | 73/116 |
| 5,539,644 | 7/1996 | Ichikawa et al. | 701/110 |

FOREIGN PATENT DOCUMENTS 4365958   12/1992   Japan .
875612    3/1996    Japan .

Primary Examiner—George M. Dombroske
Attorney, Agent, or Firm—Kenyon & Kenyon

[57] ABSTRACT

A device for accurately detecting misfiring repetitively occurring in the opposing cylinders every 360° CA. An angular velocity detecting means detects the angular velocity of rotation of the crankshaft for each cylinder at the time of combustion. A first rotational change calculation means calculates a first amount of change in the rotation by finding a deviation of angular velocity between the two cylinders of consecutive combustion strokes. A second rotational change calculation means calculates a second amount of change in the rotation by finding a deviation of angular velocity between the two cylinders 360° CA before the moment at which the first rotational change calculation means has detected the angular velocity to calculate the first amount of change in the rotation. An adder means adds up the first amount of change in the rotation calculated by the first rotational change calculation means and the second amount of change in the rotation calculated by the second rotational change calculation means. A misfiring detecting means detects misfiring that occurs every 360° CA by comparing the amount of change in the rotation added up by said adder means with a predetermined discrimination value.

3 Claims, 7 Drawing Sheets

DEVICE FOR DETECTING MISFIRING IN A MULTI-CYLINDER INTERNAL COMBUSTION ENGINE

BACKGROUND OF THE INVENTION

1. Field of the Invention

The present invention relates to a device for detecting misfiring in an internal combustion engine and, particularly, to a device for detecting misfiring in a multi-cylinder internal combustion engine.

2. Description of the Related Art

A device for detecting misfiring has been widely known (Japanese Unexamined Patent Publication (Kokai) No. 4-365958) according to which an average amount of change in the rotational speed is found from a difference $\Delta\omega_n=(\omega_{n-4}-\omega_{n-3})-(\omega_{n-1}-\omega_n)$ between a deviation $(\omega_{n-1}-\omega_n)$ of average rotational speed of the cylinders of consecutive combustion strokes and a deviation $(\omega_{n-4}-\omega_{n-3})$ of average rotational speed of the consecutive cylinders of 360° CA before, and is compared with a misfiring discrimination value.

The above-mentioned method, however, is accompanied by a problem in that the misfiring that repeats every rotation, i.e., for every 360° CA is not detected.

FIG. 2(A) illustrates by hatching the combustion strokes of a V-type six-cylinder engine having six cylinders #1, #2, #3, #4, #5 and #6 and in which the order of ignition is #1→#2→#3→#4→#5→#6. As 360° CA elapses between the combustion strokes for cylinders #1 and #4, cylinders #2 and #5, and cylinders #3 and #6. Therefore, the cylinders #1 and #4, cylinders #2 and #5, and cylinders #3 and #6 may be misfiring every 360° CA, but such misfirings are not detected by the above-mentioned device.

Such a misfiring occurring for every 360° CA is called opposing cylinder misfiring.

SUMMARY OF THE INVENTION

In view of the above-mentioned problems, the object of the present invention is to provide a device for detecting misfiring capable of accurately detecting opposing cylinder misfiring that occurs at every 360° CA.

According to the present invention, there is provided a device for detecting misfiring in a multi-cylinder internal combustion engine, comprising:

an angular velocity detecting means for detecting the angular velocity of rotation of the crankshaft for each cylinder at the time of combustion;

a first rotational change calculation means for calculating a first amount of change in the angular velocity of rotation by finding a deviation of angular velocity between the angular velocity of two cylinders of consecutive combustion strokes;

a second rotational change calculation means for calculating a second amount of change in the rotation by finding a deviation of angular velocity between the two cylinders 360° CA before the moment at which said first rotational change calculation means has detected the angular velocity to calculate the first amount of change in the rotation;

an adder means for adding up the first amount of change in the rotation calculated by the first rotational change calculation means and the second amount of change in the rotation calculated by the second rotational change calculation means; and a misfiring detecting means for detecting misfiring that occurs for every 360° CA by comparing the amount of change in the rotation added up by said adder means with a predetermined discrimination value.

The present invention may be more fully understood from the description of the preferred embodiments of the invention set forth below, together with the accompanying drawings.

DESCRIPTION OF THE PREFERRED EMBODIMENTS

Figure 1:
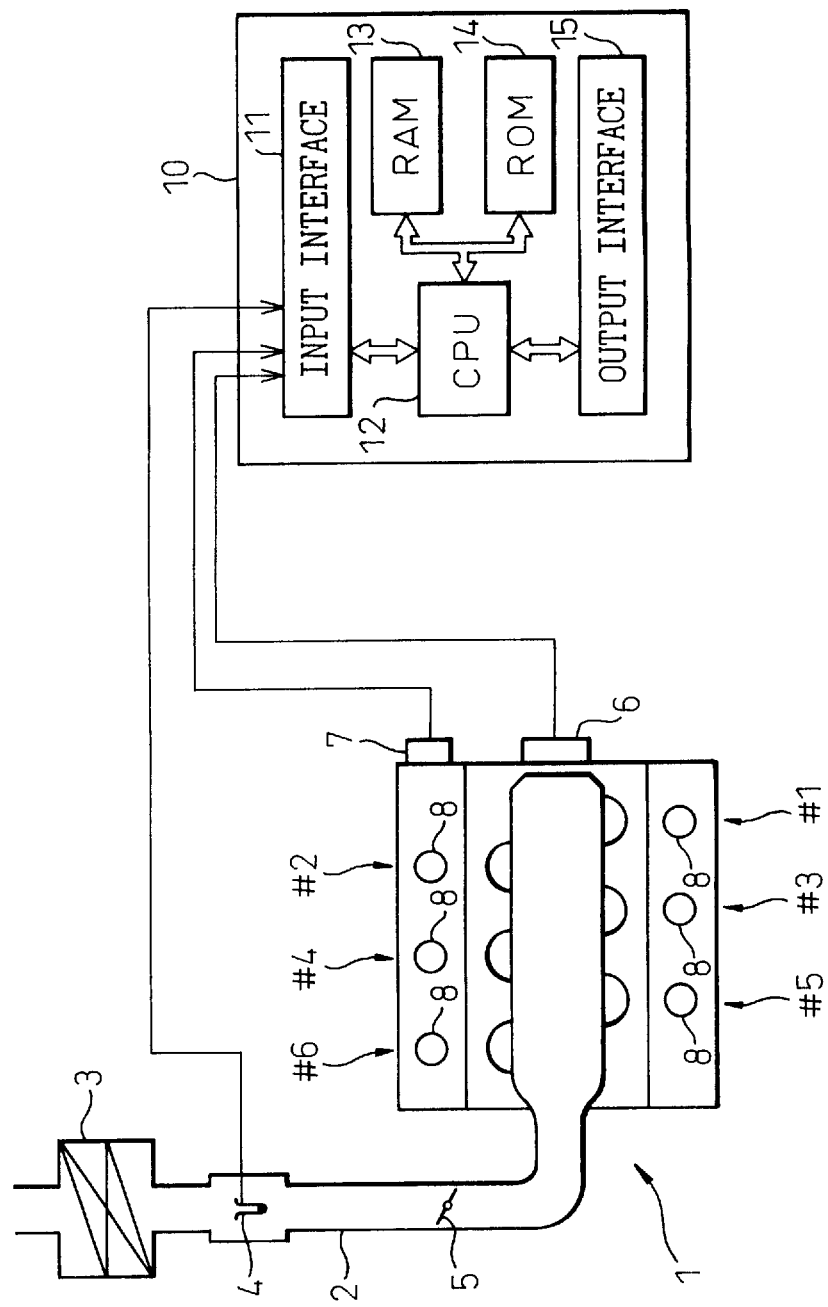
FIG. 1 is a diagram illustrating the constitution of an embodiment of the present invention.

An embodiment of the present invention will now be described with reference to the accompanying drawings. FIG. 1 is a diagram illustrating the constitution of a device for detecting misfiring according to the present invention.

In FIG. 1, reference numeral 1 denotes a V-type six-cylinder engine mounted on an automobile having cylinders #1, #3 and #5 arranged in one bank and cylinders #2, #4 and #6 arranged in another bank. The engine is provided with spark plugs 8 for each of the cylinders, the order of ignition being #1→#2→#3→#4→#5→#6.

The engine 1 is equipped with an intake passage 2 in which are arranged an air flow meter 4 for detecting the amount of the intaken air through an air cleaner 3, and a throttle valve 5. Reference numeral 6 denotes a crank angle sensor for detecting the rotation of the crankshaft, and 7 denotes a reference position sensor for generating a reference position signal of the crankshaft based on the rotation of the cam shaft. The reference position sensor 7 generates a reference position signal at a top dead center of compression of the cylinder #1 for every two rotations of the crankshaft, i.e., for every 720° CA. Reference numeral 10 denotes an engine control unit (hereinafter referred to as ECU) which comprises a digital computer and is equipped with an input interface 11, a CPU 12, a RAM 13, a ROM 14 and an output interface 15 that are connected to each other. The CPU 12 detects misfiring in the opposing cylinders by executing the operation that will be described later based upon a signal from the air flow meter 4 through the input interface 11, a signal from the crank angle sensor 6 and a signal from the reference position sensor 7. The CPU 12 further executes many control operations inclusive of basic control operations such as controlling the amount of fuel injection, controlling the ignition timings, and the like operations. For this purpose, various other sensors are mounted on the engine 1 or on the like components, but are not diagramed here.

Figure 2A:
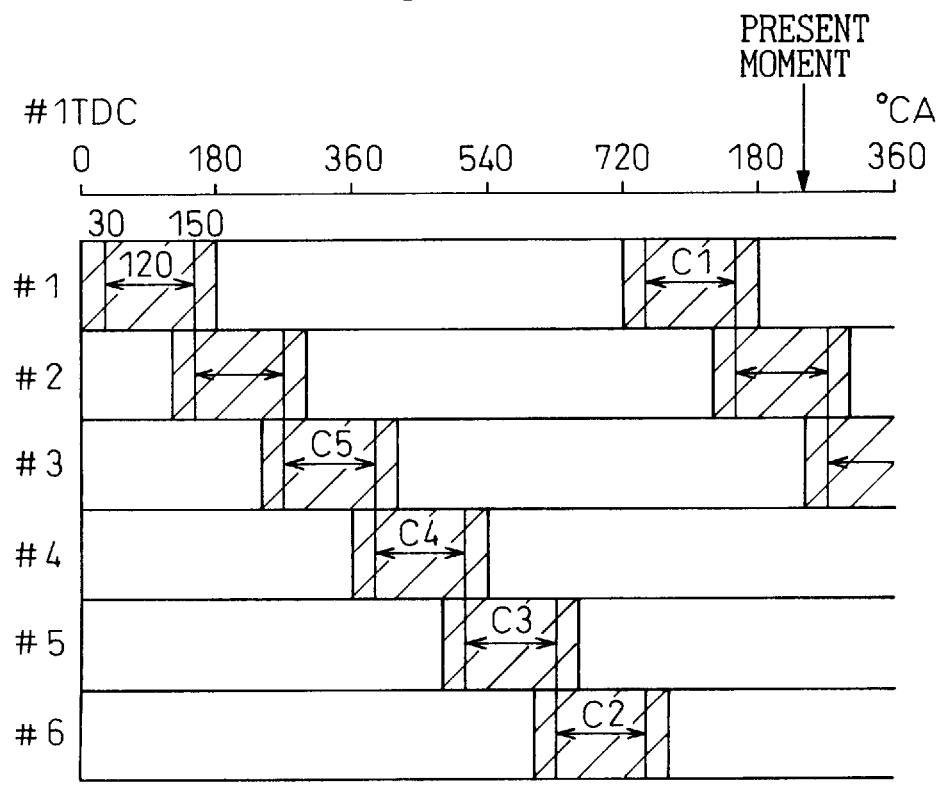
FIGS. 2(A) to 2(C) are charts for explaining the operation of the embodiment.
Figure 2B:
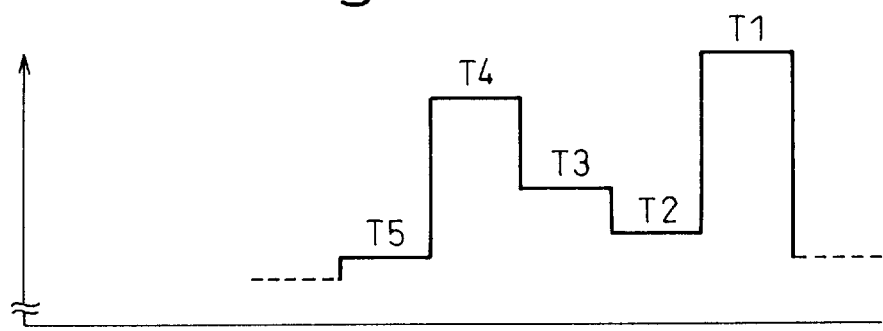
Figure 2C:
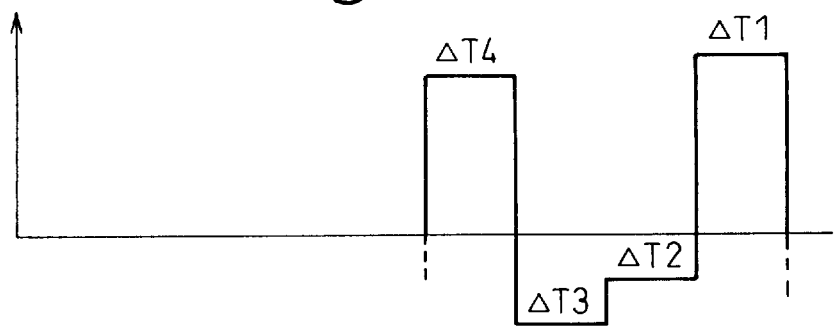

FIGS. 2(A) to 2(C) are charts for explaining the operation of the embodiment of the invention. FIG. 2(A) illustrates the timings of combustion strokes of the cylinders and the order of the timings of when the top dead center of compression of the cylinder #1 of the engine 1 is set to be 0° CA. In FIG. 2(A), the hatched portions represent combustion strokes in the cylinders. As described above, the combustion stroke takes place for every 360° CA for the cylinders #1 and #4, for the cylinders #2 and #5, and for the cylinders #3 and #6.

The time required for passing through 120° CA of from 30° CA after the top dead center of compression to 150° CA after the top dead center of compression is measured during the combustion stroke in each cylinder.

The angular velocity referred to in the claims is an inverse number of the required time. However, the operation for detecting misfiring is better executed by using the required time. In the embodiment described later, therefore, the operation is executed without converting the required time into the angular velocity. Even in the following description, the required time is used without converting it into the angular velocity.

FIG. 2(B) illustrates times required for passing through 120° CA in the combustion strokes. If the present moment is indicated by the vertical arrow on the crank angle, then, shown in FIG. 2(B) at present moment is a time T1 required for passing through 120° CA that is indicated by C1 in FIG. 2(A). The time T1 that is now indicated is denoted by $T1=T120_i$.

Symbol T2 denotes a time required for passing through 120° CA during the preceding combustion stoke in the cylinder #6 and corresponds to C2, i.e., $T2=T120_{i-1}$. Similarly, symbol T3 denotes a time required for passing through 120° CA during the further preceding combustion stroke in the cylinder #5 and corresponds to C3, i.e., $T3=T120_{i-2}$. Similarly, symbol T4 denotes a time required for passing through 120° CA during the still preceding combustion stroke in the cylinder #4 and corresponds to C4, i.e., $T4=T120_{i-3}$. Symbol T5 denotes a time required for passing through 120° CA during the yet further preceding combustion stroke in the cylinder #3 and corresponds to C5, i.e., $T5=T120_{i-4}$.

FIG. 2(C) shows differences in the values of FIG. 2(B), i.e., $$\Delta T1=T1-T2=T120_i-T120_{i-1}$$

$$\Delta T2=T2-T3=T120_{i-1}-T120_{i-2}$$

$$\Delta T3=T3-T4=T120_{i-2}-T12_{i-3}$$

$$\Delta T4=T4-T5=T120_{i-3}-T120_{i-4}$$

which are differences in the times required for passing through 120° CA between the two consecutive combustion strokes, or which, in other words, are changes in the angular velocities of rotation between the two cylinders of consecutive combustion strokes.

Therefore, $\Delta T4$ represents a change in the rotation of 360° CA earlier than $\Delta T1$. In this case as shown in FIG. 2(C), the values $\Delta T4$ and $\Delta T1$ are large, indicating that a large change in the rotation is taking place for every 360° CA resulting in the occurrence of misfiring in the opposing cylinders.

According to the prior art, a difference is found between $\Delta T4$ and $\Delta T1$, which, however, is so small that no distinction can be made when $\Delta T4$ and $\Delta T1$ are both assuming small values or are assuming intermediate values. Therefore, despite $\Delta T4$ and $\Delta T1$ assuming large values indicating the occurrence of misfiring in the opposing cylinders, this fact is not demonstrated, and it becomes no longer possible to discriminate the occurrence of misfiring in the opposing cylinders.

According to the present invention, therefore, a change $\Delta T_{360}$ in the angular velocity of rotation for every 360° CA is found upon adding $\Delta T1$ and $\Delta T4$ together, i.e., $\Delta T_{360}= \Delta T1+\Delta T4$. The value $\Delta T_{360}$ is compared with a predetermined discrimination value. When the value $\Delta T_{360}$ is larger than the discrimination value, it is so discriminated that misfiring is occurring in the opposing cylinders.

When the order of ignition of the six-cylinder engine is #1→#2→#3→#4→#5→#6 as in this embodiment, there is a probability that misfiring may occur in the opposing cylinders #1 and #4, #2 and #5, and #3 and #6.

Here, if the cylinder #1 and the cylinder #4 are defined to be a first group of cylinders, the cylinder #2 and the cylinder #5 to be a second group of cylinders, and the cylinder #3 and the cylinder #6 to be a third group of cylinders, the misfiring in the first group of opposing cylinders, the misfiring in the second group of opposing cylinders, and the misfiring in the third group of opposing cylinders can be easily discriminated when the engine rotational speed NE is low owing to their large differences from those of the normal state (large S/N ratio). Therefore, a discrimination value can be used in common.

When the engine rotational speed NE is high, on the other hand, the difference from the normal state varies depending upon the first group of cylinders, second group of cylinders and third group of cylinders. When a common discrimination value is used, therefore, it happens that misfiring can be detected in, for example, the first group of opposing cylinders but misfiring is detected in neither the second group of opposing cylinders nor in the third group of opposing cylinders.

According to this embodiment, therefore, a common discrimination value L during a low-speed rotation (e.g., lower than 2500 rpm), a discrimination value M for the first group of cylinders during a high-speed rotation (e.g., not lower than 2500 rpm), a discrimination value N for the second group of cylinders during the high-speed operation, and a discrimination value O for the third group of cylinders during the high-speed operation, are found in advance by experiment in relation to the rotational speed NE and the amount of the air GN representing the load, and are stored in the form of maps in a ROM 14. During the low-speed rotation, the value $\Delta T_{360}$ is compared with the common discrimination value L irrespective of the group of cylinders. During the high-speed rotation, the value $\Delta T_{360}$ is compared with the discrimination values M, N, O depending upon the group of cylinders. When the value $\Delta T_{360}$ is larger than the discrimination values, it is determined that misfiring is occurring in the opposing cylinders and when the value $\Delta T_{360}$ is smaller than the discrimination values, it is determined that no misfiring is occurring in the opposing cylinders.

Figure 3:
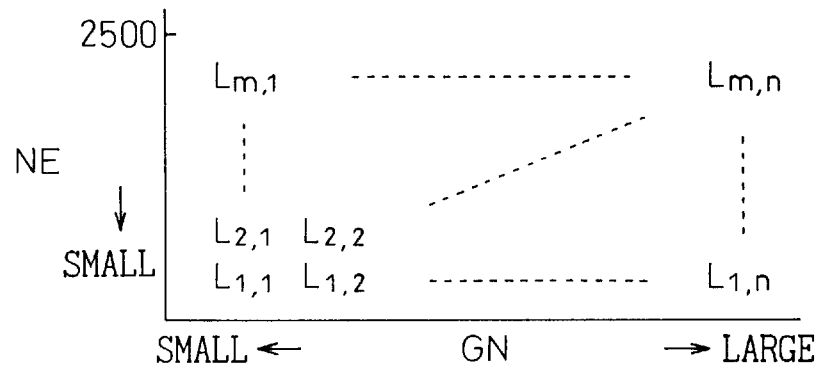
FIG. 3 shows a map of discrimination values common for the cylinders during the low-speed rotation.
Figure 4:
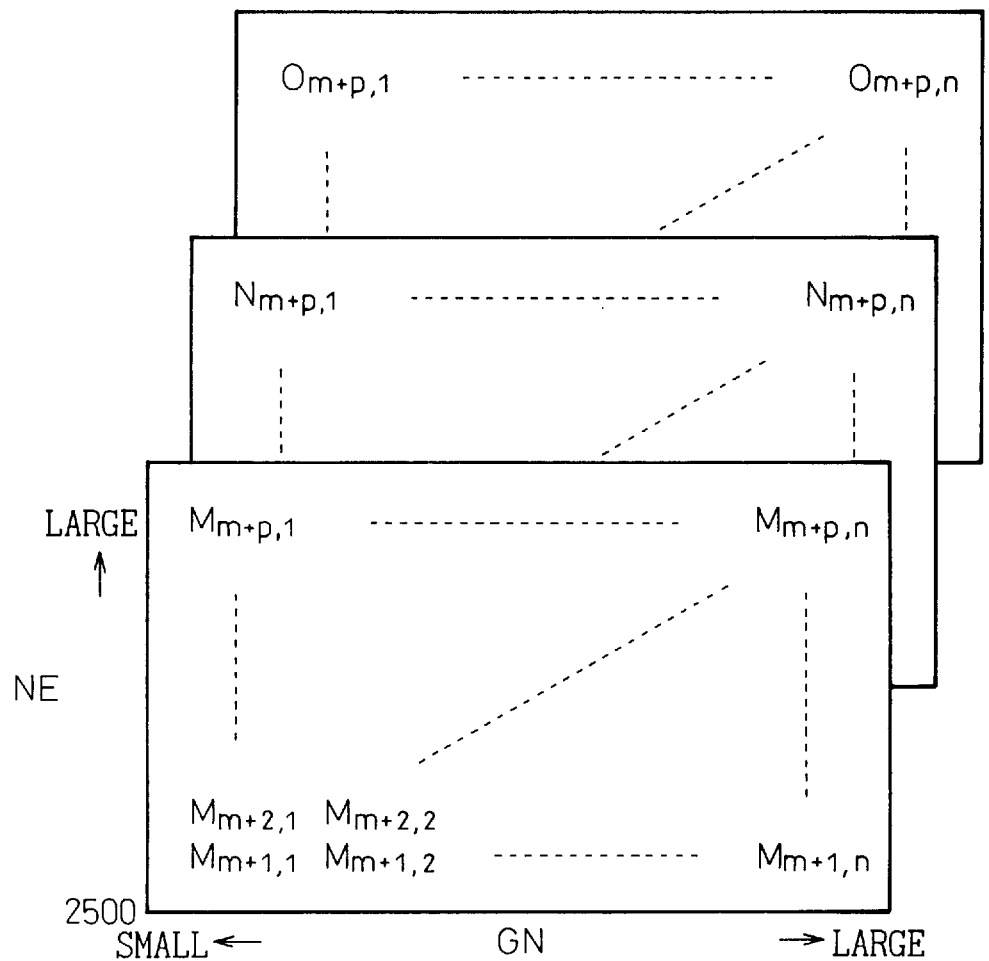
FIG. 4 shows maps of discrimination values for each of the cylinders during the high-speed rotation.

FIG. 3 illustrates the common discrimination value L for the low-speed rotation, and FIG. 4 illustrates maps M, N, O of discrimination values for the groups of cylinders for the high-speed rotation. Dividing the discrimination values makes it possible to suppress an increase in the capacity of the ROM 14.

Figure 5:
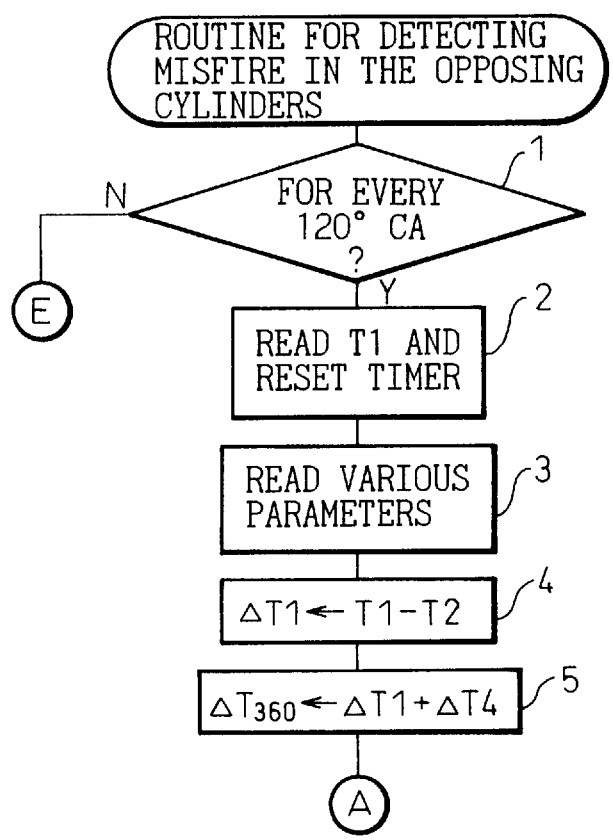
FIGS. 5 to 7 are flow charts explaining the operation for detecting misfiring carried out by an ECU.
Figure 6:
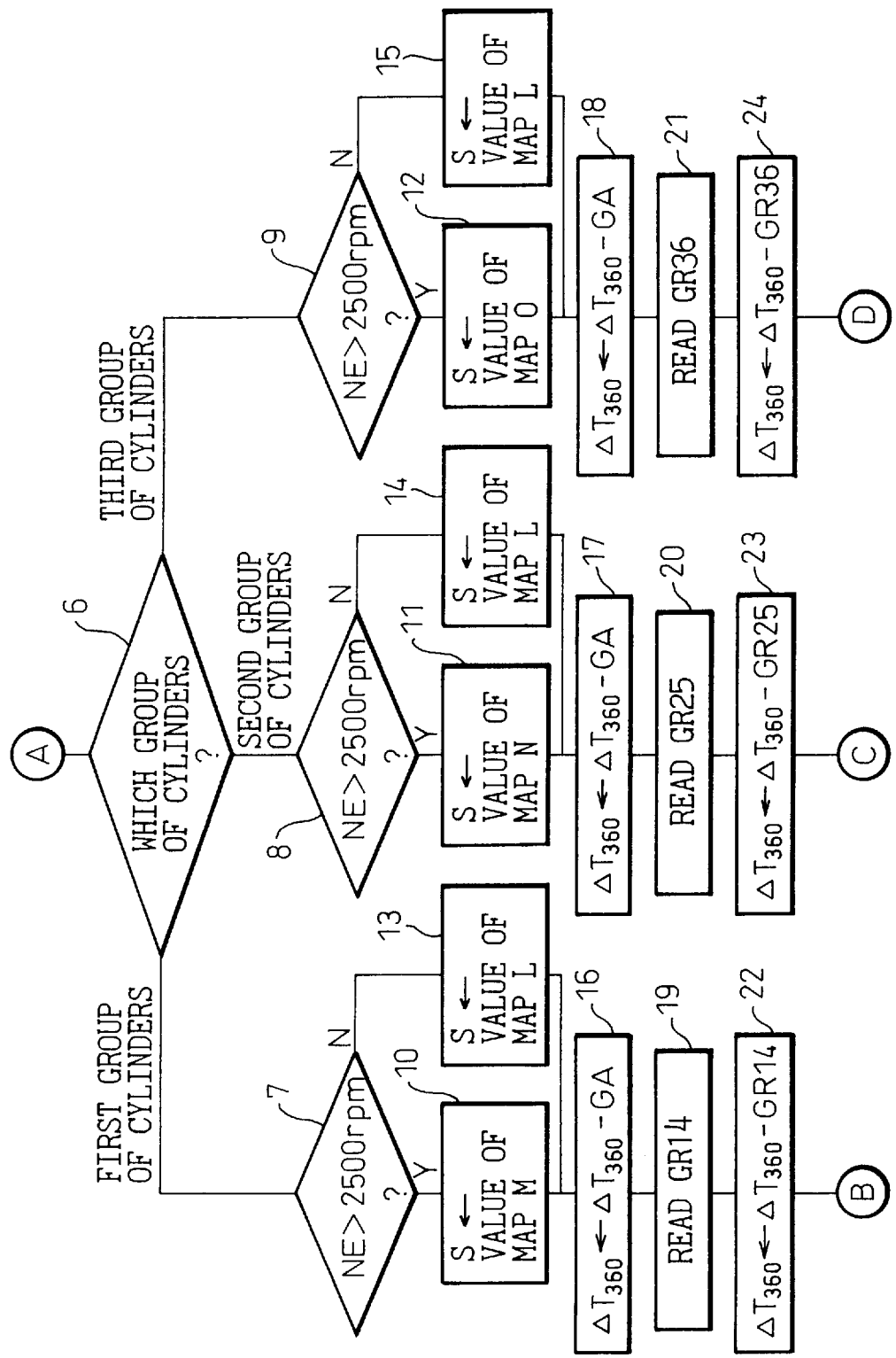
Figure 7:
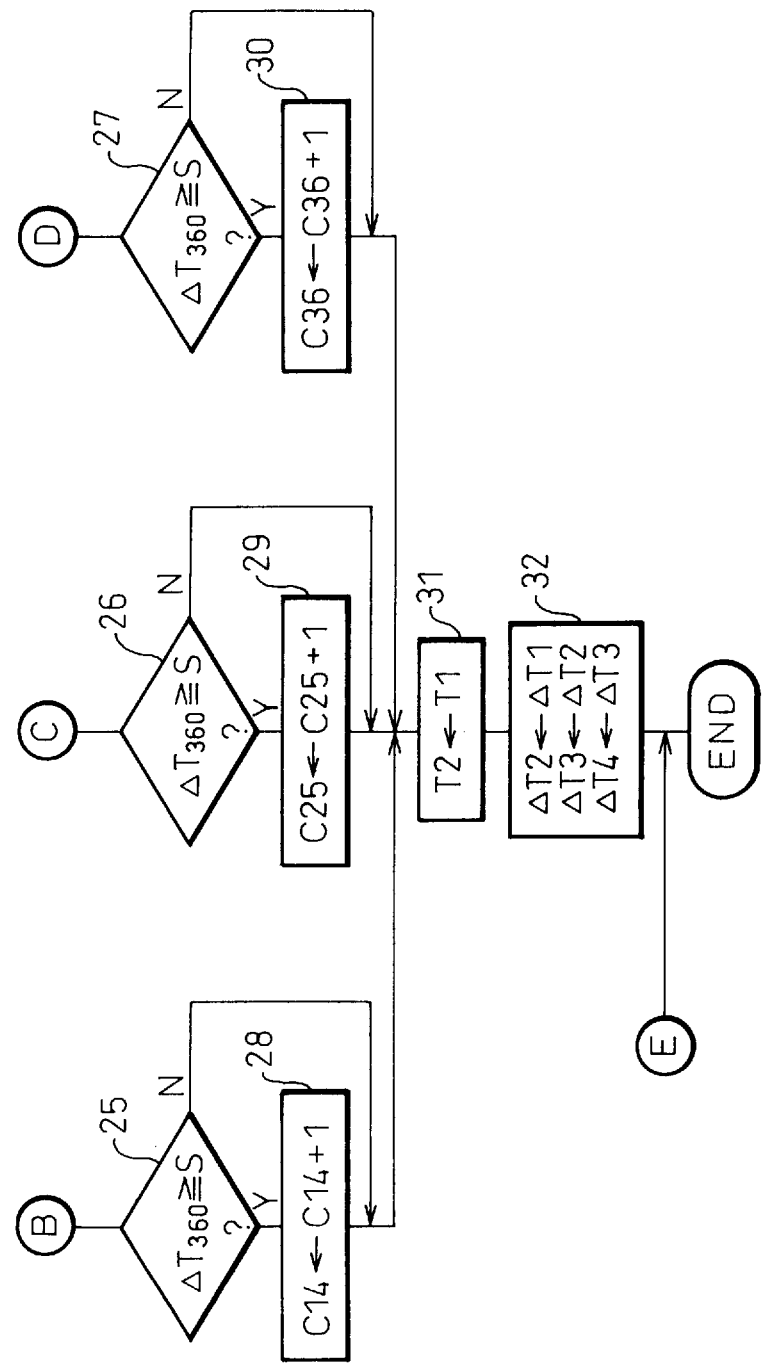

Described below in further detail with reference to flow charts of FIGS. 5 to 7 is a routine for detecting misfiring in the opposing cylinders executed by the ECU 10 based upon the above-mentioned idea.

The routine is interrupt-processed for every 30° CA. At a step 1, it is determined whether the interrupt timing of this time is 30° CA, 150° CA, 270° CA, 390° CA, 510° CA, or 630° CA after the top dead center of the cylinder #1 generated by the reference position sensor 7 for every 720°

CA. This is to establish a point of starting the measurement of change in the rotation. When the interrupt timing of this time is none of the above-mentioned timings, the routine ends. When the interrupt timing is any one of the above-mentioned timings, the routine proceeds to a step 2.

At a step 2, a value of the timer at the interrupt timing of this time—the timer being reset at the previous interrupt timing—is read as T1 and is reset, and measurement is started to measure the time required for passing through 120° CA until the interrupt timing of the next time.

At a step 3, various parameters necessary for the operation of the routine are read. Among them are included the time T2 required for passing through 120° CA of the previous time, the time T3 required for passing through 120° CA of the further previous time, the time T4 required for passing through 120° CA of the still further previous time, engine rotational speed NE, amount GN of the intaken air, etc. that have been stored in the RAM 13.

At a step 4, T2 is subtracted from T1 to find $\Delta T1$.

At a step 5, $\Delta T1$ and $\Delta T4$ are added to find $\Delta T_{360}$. Here, a value used as $\Delta T1$ three times before has been stored as $\Delta T4$ in the RAM 13. Therefore, this value is read and is used as $\Delta T4$.

At the next step 6, the group of opposing cylinders the misfiring of which is to be detected is determined by the routine that is now being executed. This is done as described below in detail.

The rotor (not shown) of the crank angle sensor 6 attached to the crankshaft has protruded portions at an interval of 30° CA, and generates 24 pulses per two rotations of the engine. The ECU 10 contains a crank angle counter (not shown), and the counted value CCRNK of the crank angle counter is reset to 0 at the compression TDC (by a signal of the reference position sensor 7) of the cylinder #1, and is counted up one by one every time when the pulse is input every after 30° CA. Therefore, the range of value CCRNK lies $0 \leq CCRNK \leq 23$.

The groups of cylinders are discriminated as described below.

When the present CCRNK<12, a value of an integer portion obtained by dividing CCRNK by 4 is denoted by CYLW.

CYLW=1 represents a first group of cylinders,
CYLW=2 represents a second group of cylinders, and
CYLW=0 represents a third group of cylinders.

When, for example, CCRNK=7, a value obtained by dividing it by 4 is 1.75 and its CYLW is 1 representing that the operation is being executed to detect misfiring in the first group of opposing cylinders.

When the present CCRNK$\geq$12, a value obtained by subtracting 3 from a value of an integer portion obtained by dividing CCRNK by 4 is denoted by CYLW.

CYLW=1 represents a first group of cylinders,
CYLW=2 represents a second group of cylinders, and
CYLW=0 represents a third group of cylinders.

When, for example, CCRNK=14, a value obtained by dividing it by 4 is 3.5 and its integer portion is 3 . The CYLW obtained by subtracting 3 therefrom is 0, representing that the operation is being executed to detect misfiring in the third group of opposing cylinders.

Figure 8:
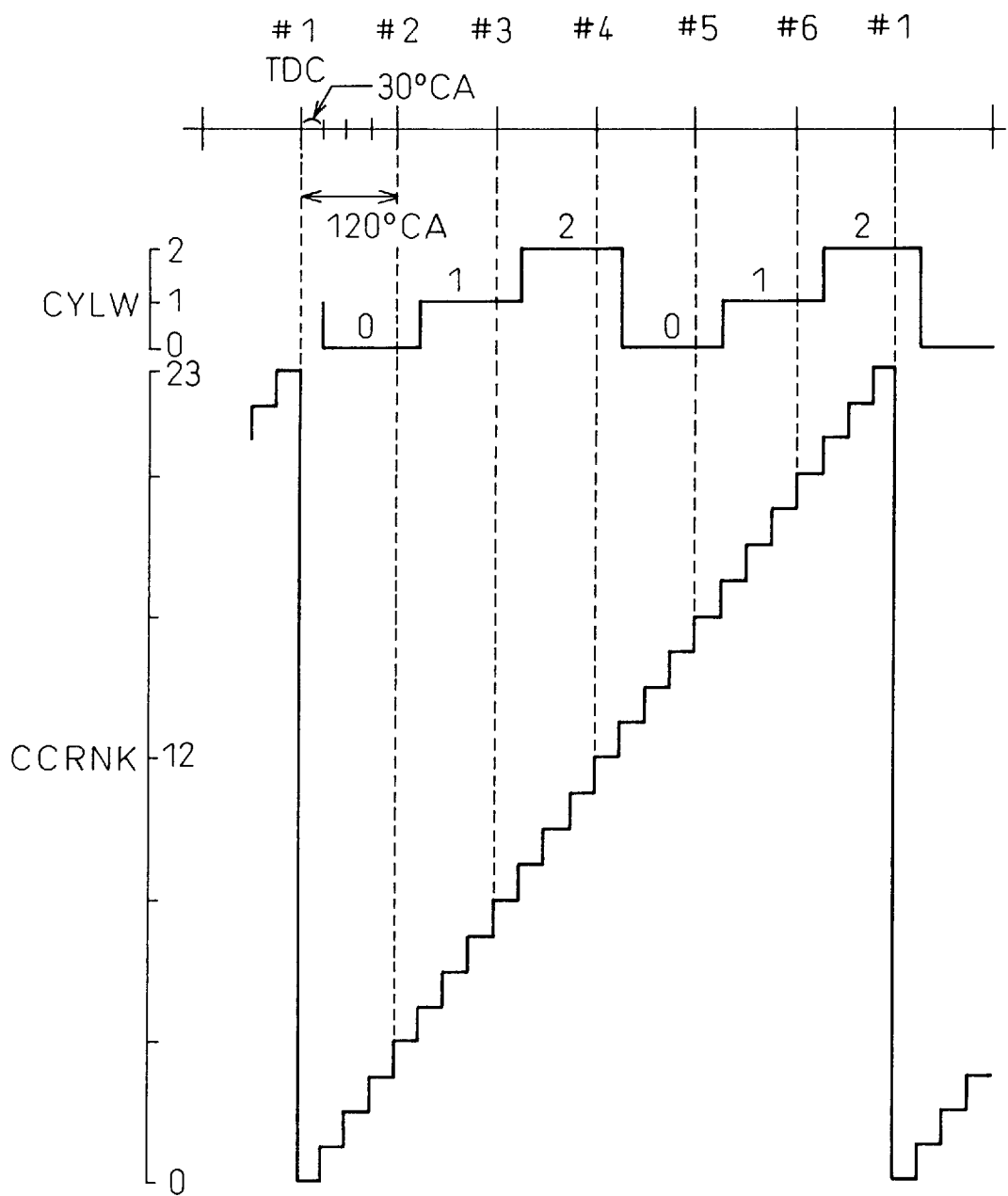
FIG. 8 is a time chart for explaining a discrimination of misfiring of which group of opposing cylinders is to be detected by a routine that is now being executed.

FIG. 8 is a time chart for explaining the above described discrimination of the groups of cylinders.

As described above, the step 6 discriminates the groups of cylinders. The routine proceeds to a step 7 when the first group of cylinders are discriminated, proceeds to a step 8 when the second group of cylinders are discriminated, and proceeds to a step 9 when the third group of cylinders are discriminated. It is further discriminated whether the rotational speed is low or high. In this embodiment, the rotational speed is regarded to be low when it is lower than 2500 rpm and is regarded to be high when it is not lower than 2500 rpm.

When the discrimination at the step 7 is YES, i.e., when the first group of cylinders are discriminated and the rotational speed is high, the routine proceeds to a step 10 where a discrimination value for the first group of cylinders is read out from the map M as a discrimination value S depending upon the rotational speed NE and the load GN at that moment. When the discrimination at the step 7 is NO and the rotational speed is low, the routine proceeds to a step 13 where a common discrimination value for the low-speed rotation is read out from the map L as the discrimination value S depending upon the rotational speed NE and the load GN at that moment.

Similarly, when the second group of cylinders are discriminated and the rotational speed is high, the routine proceeds to a step 11 where a discrimination value for the second group of cylinders is read out from the map N. When the rotational speed is low, a common discrimination value is read out from the map L at a step 14.

Similarly, when the third group of cylinders are discriminated and the rotational speed is high, the routine proceeds to a step 12 where a discrimination value for the third group of cylinders is read out from the map O. When the rotational speed is low, a common discrimination value is read out from the map L at a step 15.

The next steps 16 to 24 are for correcting the value $\Delta T_{360}$ found at the step 5. GA at the steps 16, 17 and 18 is for compensating T120 that has changed due to acceleration or deceleration. Here, GA is an arithmetical mean of a change in the rotation $\Delta T14$ of the first group of cylinders, i.e., of the cylinder #1 and the cylinder #4, a change in the rotation $\Delta T25$ of the second group of cylinders, i.e., of the cylinder #2 and the cylinder #5, and a change in the rotation $\Delta T36$ of the third group of cylinders, i.e., of the cylinder #3 and the cylinder #6 or is, in other words, the one obtained by adding up the above changes and by dividing the sum by 3.

That is, GA=$(\Delta T14+\Delta T25+\Delta T36)/3$ which is used for compensating a change in T120 caused by acceleration or the deceleration.

At the next steps 19, 20 and 21, correction values GR14, GR25 and GR36 are read out from the RAM 13. The correction values are to cancel the effect caused by deviation in the width of teeth of the rotor of the crank angle sensor. The effect due to the width of teeth of the rotor differs depending upon the groups of cylinders. Therefore, correction values learned up to the previous time are stored in the RAM 13 for the groups of the cylinders.

The correction values are learned values obtained by separate routines from a change in the rotation when the fuel is cut at the time of deceleration where there is no effect of combustion but an effect appears due only to deviation in the width of teeth of the rotor of the crank angle sensor. When GN14=$\Delta T14$-GA, GN25=$\Delta T25$-GA and GN36=$\Delta T36$-GA, then, the correction value GR14 for the first group of cylinders, the correction value GR25 for the second group of cylinders and the correction value GR36 for the third group of cylinders are given as follows:

GR14=GR14+(GR14-GN14)/4

GR25=GR25+(GR25-GN25)/4

GR36=GR36+(GR36-GN36)/4

Here, GR14+GR25+GR36=0 and, hence, GR36=(GR14+GR25).

After the value $\Delta T_{360}$ found at the step 5 is corrected through the steps 16 to 24, the routine proceeds to the steps 25, 26 and 27. At the steps 25, 26 and 27, the value $\Delta T_{360}$ corrected as described above is compared with the values S read out from the corresponding maps at the steps 10, 11, 12 or at the steps 13, 14, 15.

When the discrimination is YES at the steps 25, 26, 27, i.e., when the corrected value $\Delta T_{360}$ is larger than the discriminated value, it means that misfiring is occurring in the opposing cylinders. At steps 28, 29 and 30, therefore, misfiring counters C14, C25 and C36 are increased by one, the misfiring counters C14, C25, C36 counting the number of times of misfiring in the groups of cylinders.

On the other hand, when the discrimination is NO at the steps 25, 26, 27, i.e., when the corrected value $\Delta T_{360}$ is smaller than the discriminated value, it means that no misfiring is occurring in the opposing cylinders. Therefore, the routine proceeds to a step 31 without passing through the steps 28, 29, 30, and where T1 is substituted for T2 to update it so as to be ready for executing the routine by the interrupt processing of the next time. The routine further proceeds to a step 32 where $\Delta T1$, $\Delta T2$ and $\Delta T3$ are substituted for $\Delta T2$, $\Delta T3$ and $\Delta T4$ to update them, and the routine ends.

The above-mentioned routine does not deal with the operation after the occurrence of misfiring is detected and after the values of the misfiring counters C14, C25, C36 are increased. It is, however, possible to turn on an alarm lamp when the values of the counters C14, C25, C36 become larger than the predetermined number of times. By providing the misfiring counters for the groups of cylinders, furthermore, it is easy to determine which group of cylinders are misfiring.

As described above, the above-mentioned embodiment makes it possible to accurately detect misfiring in the opposing cylinders.

According to the present invention, the amount of change in the rotation of this time and the amount of change in the rotation of 360° CA before are averaged, and the averaged value is compared with the discrimination value to accurately detect misfiring in the opposing cylinders.

I claim:

1. A device for detecting misfiring in a multi-cylinder internal combustion engine, comprising:

an angular velocity detecting means for detecting an angular velocity of rotation of the crankshaft at the time of combustion in each cylinder of the engine, wherein the cylinders fire one after another in a predetermined order;

change calculation means for calculating an amount of change in the angular velocity of rotation between combustion strokes of consecutively firing cylinders;

a memory for recording the amounts of change in the angular velocity of rotation calculated by the change calculation means;

an adder means for adding an amount of change in the angular velocity of rotation corresponding to a first pair of consecutively firing cylinders to a recorded amount of change in the angular velocity of rotation corresponding only to a second pair of cylinders consecutively firing 360° CA previous to the firing of the first pair of consecutively firing cylinders; and a misfiring detecting means for detecting misfiring that occurs every 360° CA by comparing the amount of change added up by the adder means to a predetermined discrimination value.

2. A device for detecting misfiring of a multi-cylinder internal combustion engine according to claim 1, wherein the misfiring detecting means has a separate discrimination value for each of a plurality of group of cylinders, wherein each group of cylinders includes two pair of consecutively firing cylinders, separated by 360° CA.

3. A device for detecting misfiring of a multi-cylinder internal combustion engine according to claim 2, wherein the separate discrimination values for each of the groups of cylinders are used when the rotational speed of the engine is above a predetermined threshold value, and a single discrimination value is used for all of the groups of cylinders when the rotational speed of the engine is below the predetermined threshold value.

* * * * *

UNITED STATES PATENT AND TRADEMARK OFFICE
CERTIFICATE OF CORRECTION

PATENT NO. : 5,832,404
DATED : November 3, 1998
INVENTOR(S) : Hidetoshi Amano

It is certified that error appears in the above-indentified patent and that said Letters Patent is hereby corrected as shown below:

Column 3, line 52, change "velocities" to --velocity--.

Column 8, line 31, change "includes two pair of" to --includes two pairs of--.

Signed and Sealed this

Twenty-third Day of November, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,832,404

DATED : November 3, 1998

INVENTOR(S) : Hidetoshi Amano

It is certified that error appears in the above-identified patent and that said Letters Patent is hereby corrected as shown below:

In the title page of the patent, change the assignee from "Tovota Jidosha Kabushiki Kaisha" to --Toyota Jidosha Kabushiki Kaisha--.

Signed and Sealed this

Eighth Day of February, 2000

*Attest:*

Q. TODD DICKINSON

*Attesting Officer*     *Commissioner of Patents and Trademarks*